Jan. 8, 1957    W. H. CRAWFORD    2,776,730
CHECK STAND
Filed May 25, 1953    2 Sheets-Sheet 1
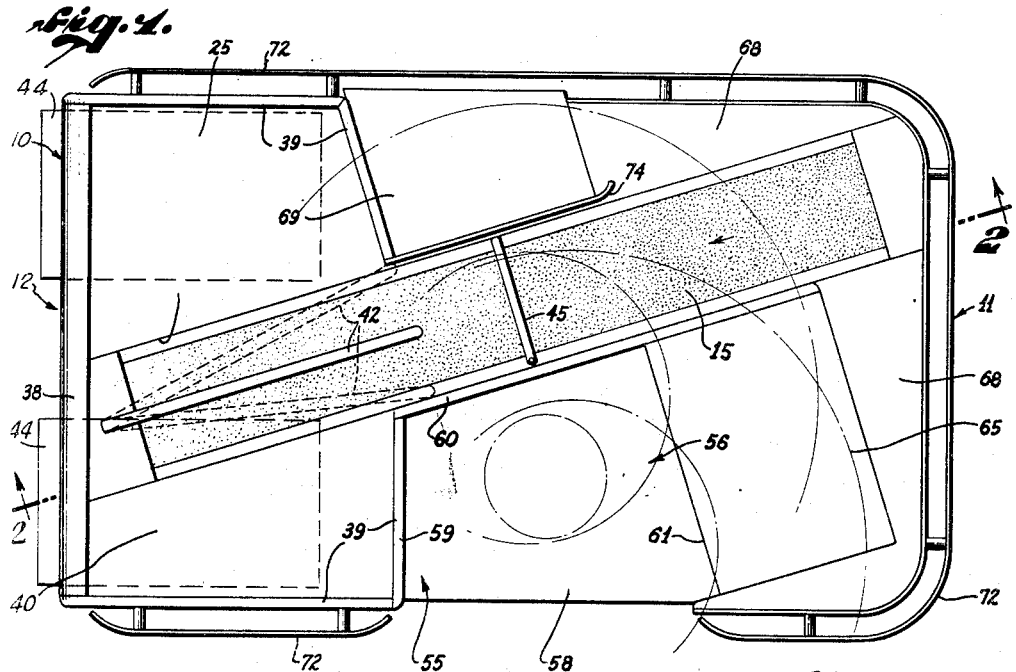
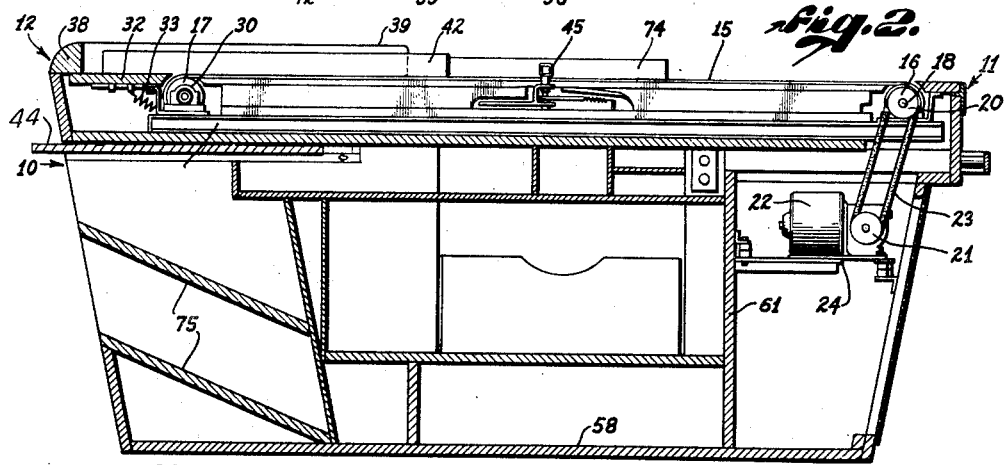
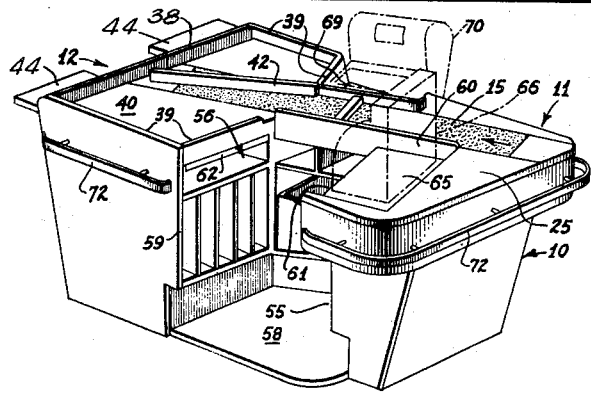
WAYLAND H. CRAWFORD,
INVENTOR.
BY
ATTORNEY.

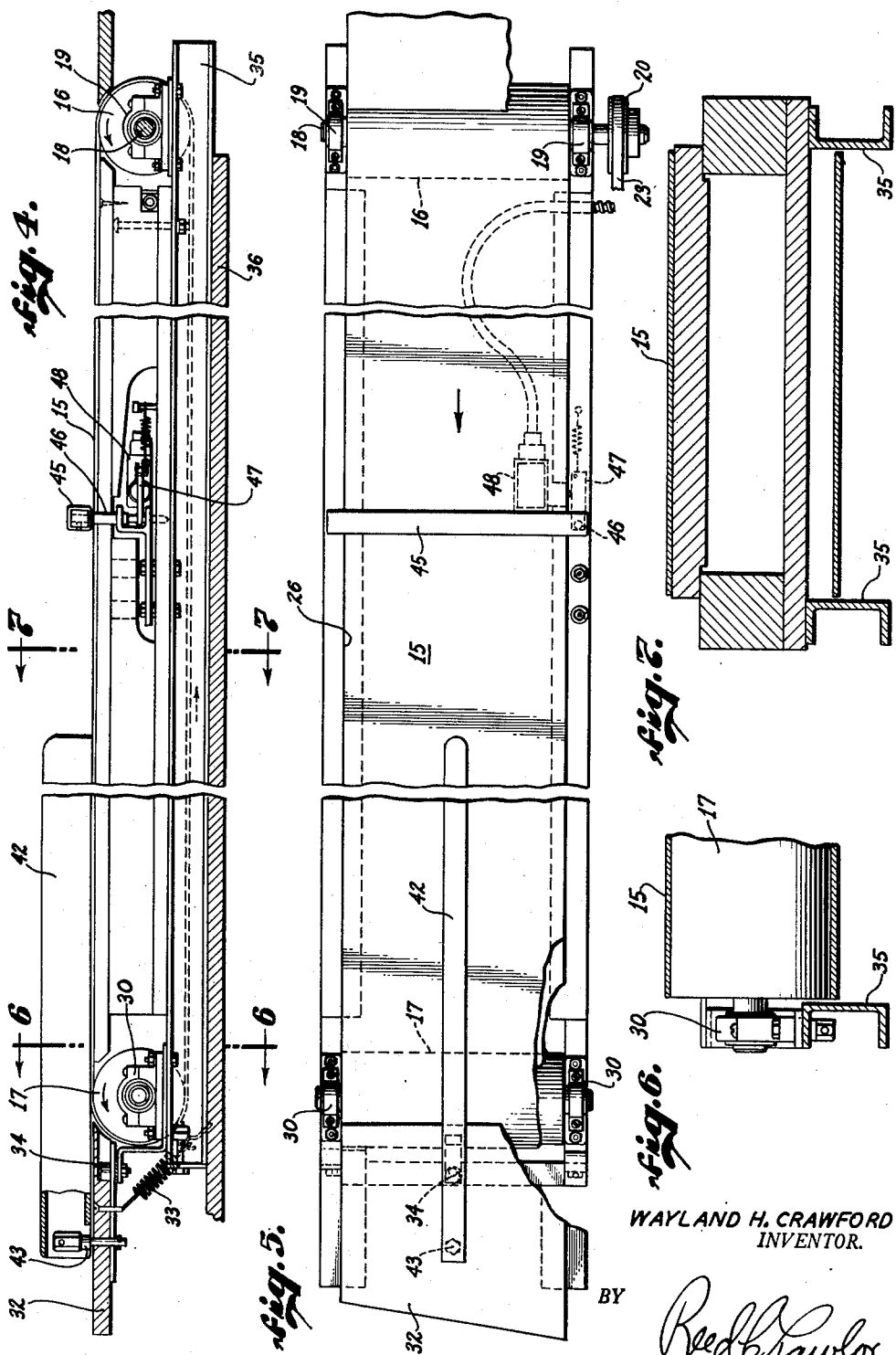

United States Patent Office 2,776,730
Patented Jan. 8, 1957

2,776,730

CHECK STAND

Wayland H. Crawford, San Gabriel, Calif., assignor to Modern Village Stores, Inc., a corporation of California Application May 25, 1953, Serial No. 356,961

3 Claims. (Cl. 186—1)

This invention relates to improvements in check stands that are employed for checking out customers in retail stores, such as grocery stores.

In many grocery stores now in use, customers select their groceries and then cart them in suitable carriages to a checking out point where a checker, or cashier, checks the items purchased and determines the total sale price to be paid by the customer. This method of merchandising has also been extended to other retail stores, such as drug stores, hardware stores, gardening and feed stores, and the like. Where competion is high, as it generally is in most communities, it is highly desirable to perform the checking out operation rapidly, accurately, and with a minimum expense.

Check stands employed for the purpose outlined above usually are in the form of a counter or table, a conveyor belt means being incorporated therein for feeding a succession of items to be checked from an unloading position to a delivery or sacking position. In this arrangement, the customer unloads the items on a loading platform at the loading position and places them on the conveyor belt means which carries them to a checking position where items are checked by the checker or cashier. The items are then conveyed by the conveyor belt means to a sacking platform where the sacker places the items in suitable bags, boxes or other containers.

It is an important object of this invention to provide a check stand which is so constructed and arranged that it makes for greater convenience, facility and efficiency in handling the purchased items to be checked than is possible with conventional check stands heretofore employed for the same purpose.

Another object of the invention is to provide a check stand which is substantially rectangular in plan outline and which has a conveyor including belt means movable in a path extending in the general direction of the longer dimension of the rectangle and substantially obliquely with respect thereto. By this arrangement, the use of a longer conveyor, within the confines of a check stand of conventional size, is made possible. In accordance with the invention, the starting or unloading end of the conveyor, where the items are unloaded from a cart and placed on the conveyor, is located at a corner of the stand which defines the entrance to a passageway or aisle through which the customer exits after the purchased items have been checked. By this provision, the customer, in unloading the cart, assumes a position at said corner or in the aisle adjacent thereto. After the articles have been placed on the conveyor the cart may be conveniently pushed to an adjacent storage area for use by another customer. Consequently, by arranging the rearward, starting end of the conveyor at the corner of the stand, placing of the items to be checked upon the conveyor is greatly facilitated and the problem of quickly disposing of an empty cart, so as not to interfere with the other loaded carts approaching the check stand, is effectively solved, with the result that the checking out of the customers proceeds in a quick and orderly manner. In addition, since the disposing of the empty carts is effected by the customers, the checker is left free to concentrate his or her efforts on checking and tallying the costs of the items and this results in a material increase in the number of customers which may be serviced in a given period of time.

Another object of the invention is to provide a check stand, of the character referred to, which is provided with a niche or opening at the side of the conveyor opposite to the side along which the customers exit, the rearward side of the niche extending normal to the conveyor and forming the forward edge of a shelf for supporting a cash register. By this arrangement, the rearward side of the cash register faces the customer located at the loading corner of the check stand so that the prices recorded on the register are readily observable by the customer. This is an improvement over conventional check stands in which the face of the register is in a plane at right angles to the exit side of the stand and therefore is not so readily viewed by the customers. Also, by this arrangement, the checker assumes a position in which he or she faces the customer unloading the cart, while the articles to be checked are passing along the side of the checker and the prices of the articles are being tallied on the cash register.

In accordance with another object of the invention, the delivery or sacking station is located at the extreme forward end of the check stand opposite the end of the diagonally arranged conveyor belt and means are provided for diverting the checked articles alternately to the opposite corner portions at this end. Usually the sack boy assumes a position adjacent one of the corner areas but with this invention the corner areas are so located and proportioned and the niche or recess in which the checker is positioned is so located relative to said corner areas that the checked articles may be readily reached by the checker without excessive stretching so that during quiet periods, when a sack boy is not in attendance, the checker may place the articles in the containers without leaving the checking station.

This invention possesses numerous objects and features of advantage, some of which together with the foregoing will be set forth in the following description of a preferred form of the check stand. Though only a single form of check stand embodying my invention is described in detail, it is to be understood that my invention is not limited thereto but may be embodied in many forms within the scope of the appended claims.

In the drawings wherein like reference characters indicate like elements throughout the several views:

Fig. 1 is a plan view of the improved check stand;

Fig. 2 is a longitudinal sectional view, taken on line 2—2 of Fig. 1;

Fig. 3 is a perspective view, in reduced scale, of the check stand;

Fig. 4 is an enlarged longitudinal sectional view through the upper part of the check stand, showing the conveyor means in detail;

Fig. 5 is a plan view of the same;

Fig. 6 is a cross sectional view, taken on line 6—6 of Fig. 4; and

Fig. 7 is a cross sectional view, taken on line 7—7 of Fig. 4.

Referring to the drawings in detail, the invention consists generally of a flat-topped counter-like or table-like stand structure 10 of substantially rectangular shape in plan. One end 11 of the check stand provides an unloading station where articles selected by a customer are removed from the shopping cart and placed on the check stand to be checked and their prices are tallied by a person serving as checker and cashier. The opposite end 12 of the check stand is designated the delivery or sacking station where the checked articles are placed in sacks, cartons or other containers. One elongated side 13 is designated the customer side and the other side 14 is designated the checker side.

The check stand includes a flat conveyor belt 15 which extends lengthwise of the structure 10, from the unloading station 11 to the sacking station 12, the belt extending around a pulley or roller 16 at the unloading station and a similar pulley 17 at the sacking station. As shown in Figs. 2, 4 and 5, the roller 16 is carried by a shaft 18, journaled in bearings 19. Fixed to the shaft 18 is a pulley 20 which is driven from a similar pulley 21 on the armature shaft of an electric motor 22 by means of a belt 23, the motor being supported by a mounting means 24 located beneath the conveyor belt. As shown best in Fig. 4, the top portion or stretch of the conveyor belt is arranged substantially flush with the upper surface of the flat platform 25 providing the top of the check stand, said platform having an elongate cutout 26 in which the conveyor belt is disposed.

At the delivery or sacking end of the check stand, the shaft of the idler roller or pulley 17 is journaled in bearings 30 which are mounted for adjustment toward and away from the pulley 16 so as to adjust the tension of the conveyor belt 15. A slidable section 32 of the platform 25 closes the forward end of the cut-out 26 and normally is urged toward the idler pulley 17 by means of a spring 33, stop means 34 being provided for limiting such rearward movement of the section. Such a combined adjusting and stop means is disclosed and claimed in another application, Serial No. 329,654, filed January 5, 1953, for "Conveyor System for Check Stands" by the instant inventor, now Patent No. 2,755,910.

As shown in Figs. 4 and 7, the entire conveyor belt means, with the exception of the driving motor 22, is supported by transversely spaced channel rails 35 which, in turn, are mounted on a false bottom 36 forming part of the check stand structure 10 and arranged below the upper surface or platform 25 thereof. At the extreme forward or sacking end of the structure 10 is a transversely extending strip 38 providing a backstop for guiding against feeding of the checked articles beyond this end of the stand by the conveyor belt. Similar boards or strips 39 are provided at the sides of the sacking end of the check stand, the strips 38 and 39 thus defining an enclosure or compartment 40 into which the checked articles are fed to be sacked for delivery to the customers.

A diverter arm 42 is pivoted at 43 to the slidable section 32 for pivotal movement in a horizontal plane to either of its two positions indicated by the broken lines in Fig. 1, so as to provide a means for guiding the checked articles selectively into either side of the compartment 40 for sacking.

Arranged at the checker's station, to be presently described, in overlying transverse relation to the conveyor belt 15, is a cross-arm 45 which serves as a barrier which stops articles being fed by the conveyor belt in the event that the checker fails to check these items. In the usual procedure however, to check an item, the checker picks up each item from the conveyor belt as it approaches the barrier and records the price of the article on the cash register and then replaces the checked item on the conveyor belt at the opposite side of the barrier 45 for delivery to the sacking station. The cross-arm 45 and its mounting means is disclosed in another application, Serial No. 244,525, filed August 31, 1951, for a "Check Stand" by the present inventor, now Patent No. 2,723,728. Suffice it to state herein that the cross-arm 45 is carried by a vertical pivot pin 46 carrying an arm 47. The arm 47 is adapted to engage the actuator button of a normally closed electric switch 48 disposed beneath the upper stretch of the conveyor belt 15. The switch 48 is connected in the circuit to the electric motor 22 and when the arm 47 is pivoted in counterclockwise direction, in response to engagement of an unchecked article with the cross-arm 45, the switch is actuated to open the circuit, thereby stopping the motor and discontinuing travel of the conveyor belt. When the article is lifted by the checker, the cross-arm 45 is restored to its original position to thereby allow closing of the switch so as to resume travel of the conveyor belt.

It has been stated that a primary object of this invention is to provide a check stand which is more practical and efficient than similar check stands heretofore used for handling articles purchased by customers in grocery, drug and similar self-service stores. One of the most important factors contributing to such increased efficiency of operation is that the conveyor belt 15, contrary to conventional practice, is arranged to extend diagonally of the rectangular check stand.

As shown in Figs. 1 and 3, the structure 10 is so arranged that the conveyor belt 15 extends from a corner of the structure at the rearward, unloading end 11, obliquely across the platform 25 to the forward, sacking end 12 of the check stand adjacent the diagonally opposite corner. That is to say, the conveyor belt, instead of following the conventional path extending parallel to the customer side of the stand, extends from one end, at a point disposed at one side of the median line of the rectangular platform 25, to the other end, at a point located at the opposite side of said median line. Thus the belt extends from a region adjacent one end of the customer side to a point terminating adjacent the sacking end in laterally inwardly-spaced relation to both sides of the stand, and the belt lies in increasingly divergent relation to the customer side of the stand from one end thereof to the other. For maximum effectiveness the belt is mounted on the stand at an angle of about 17½ degrees from the nearest side, and in any event lies between about 10° and about 30° for most satisfactory results.

The check stand structure 10 has a trapezoidal cut-out niche or recess 55 on the checker side 14 providing a checker's station 56 in which the checker may be positioned. As shown, the recess 55 is located approximately midway between the unloading and sacking ends of the check stand and at the longitudinal side of the structure which insures that when the checker faces the unloading end of the stand, the articles will feed past the left side of the checker.

The niche or recess 55 has a floor 58 upon which the checker may stand, and is defined by vertical walls 59, 60 and 61 of the structure 10, these walls being provided with various shelves, drawers and compartments for containing sacks, supplies, record books and other necessary articles used by the checker. A sliding shelf-like seat 62 is also provided for the checker.

At the side of the recess 55 nearest the unloading end 11 of the check stand is a shelf 65 for supporting a cash register 66 in a position to be conveniently operated by the right hand of the checker. It is to be noted that the shelf 65 is so arranged that the cash register 66 is located with its rearward side directed toward the unloading end 11 and with its forward, rearward median line extending parallel to the conveyor belt 15. It will be noted that with this arrangement two triangular areas 68 of about the same size and shape are formed adjacent the unloading end of the conveyor belt. One of these is directly behind the cash register. The other is directly opposite the cash register. Thus, with this arrangement the indicator numerals appearing in the window at the back of the cash register are readily observable by the customer positioned at the rearward end of the conveyor belt 15 while he is placing the selected articles on the conveyor for checking and regardless of which of the triangular areas he may be employing to help him unload.

Located on the customer side of the conveyor belt 15 opposite to the recess 55 is a shelf 69 which serves to support a weighing scale 70 in a position wherein its dial face extends parallel to the conveyor belt 15 so as to be easily read by the checker, and wherein its weighing platform is readily accessible to the left hand of the checker. Suitable guards or bumpers 72 may be provided at the sides and at the unloading end of the check stand. And a guide bar 74 is arranged adjacent the inner side of the scale to help guide articles onto the conveyor belt. Vertically spaced, inclined shelves 75 may be provided at the sacking end 12 for the purpose of holding sacks into which the checked articles are placed for delivery to the customer. Following the checking operation and payment for the articles, the customer walks along the scale side of the check stand to the delivery sacking end.

At each of the opposite corners of the end of the compartment there is a slidable sacking board 44 which may be withdrawn to facilitate sacking. The space between the sacking boards is large enough to enable a sacker to stand between them at the front end of the check stand even when both boards are withdrawn. A rack having compartments for storage of sacks is arranged on the same side of the check stand as the checker's niche and adjacent the top surface of the check stand as a convenience for the sacker. In particular it will be noted that the sack rack is to the right of the sacker when he is facing the check stand where it may be readily reached by him regardless of which sacking board he is employing.

It will be observed from the foregoing that by the use of the present check stand, the checking of articles purchased by a customer is greatly facilitated and expedited. The success of the check stand is attributed largely to the fact that the conveyor belt extends obliquely of the check stand. By this arrangement, the customer removes the articles from the shopping cart and places them upon the conveyor belt at a rearward corner of the stand first, if necessary depositing some of them on one or the other unloading areas adjacent the rearward end of the belt. Consequently, the cart, which in any case is usually disposed beside the side or the end of the check stand, is easily disposed of without interfering with other loaded carts being brought up to the stand. In addition, the position of the checker's station and the adjacent cash register is such that the checker faces the customer so that conversation is made more readily and the customer has an unobstructed view of the cash register. Furthermore, the oblique arrangement of the conveyor belt facilitates the employement of a niche 55 of quadrilateral configuration having a wide portion on the outer side of the check stand to facilitate ingress and egress of the checker and turning and movement of the checker between a checking position and a sacking position. Consequently, with this arrangement the checker may not only check and tally the articles readily but may also, without excessive reaching, remove the checked articles from either sacking area and place them in containers, while remaining at the checking station, if and when this becomes necessary. It will thus be apparent that the structure provided makes possible the more rapid and convenient processing of goods being sold by a grocery store or a similar establishment, saving time for both the employees of the store and the customer, and preventing the annoying delays which commonly occur when a number of customers are trying to pay for their purchases and have them sacked at the same time.

The invention claimed is:

1. In a check stand: a counter having an unloading end, a delivery end, an elongated side extending between said ends along which a customer may walk to exit from a position adjacent said unloading end, and an opposite side also extending between said ends; and a movable conveyor belt means extending to said delivery end from a position adjacent an unloading corner of the stand defined by the intersection of said unloading end and said elongated side, said conveyor means extending in a substantially horizontal plane and at an acute angle with respect to said elongated side, said conveyor means terminating adjacent said delivery end in laterally inwardly-spaced relation to both sides of the stand, the areas of the stand located on opposite sides of the terminal end of the conveyor means constituting sacking stations to which articles that are placed on said conveyor means at said unloading corner and conveyed by said conveyor means can be delivered by said conveyor means.

2. The structure of claim 1 including a diverter arm pivotally mounted at said delivery end and swingable over said conveyor means between first and second positions for selectively diverting articles to one of said sacking station areas or the other.

3. A check stand comprising a substantially rectangular flat-topped stand structure having first and second spaced ends for difining unloading and sacking stations respectively, and also having an elongated side interconnecting said spaced ends, and an opposite side, said flat-topped stand structure having a cut-out portion providing a checker's compartment adjacent said opposite side intermediate said first and second ends, elongated movable conveyor means horizontally disposed in substantially coplanar relation with the said flat top of said stand structure, said conveyor means including elongated substantially straight-sided flat belt means extending from a region adjacent the intersection of said first end and said elongated side, in increasingly divergent relation to said elongated side, and terminating adjacent said sacking end in laterally inwardly-spaced relation to both sides of the stand, whereby said conveyor means defines first and second sacking areas on opposite sides of said conveyor means, said conveyor means and cut-out portion further delimiting, adjacent said unloading station, a stand area for receiving a cash register between one side of said conveyor means and said opposite side of said stand structure.

References Cited in the file of this patent

UNITED STATES PATENTS

| | | |
|---|---|---|
| 2,569,711 | Foster | Oct. 2, 1951 |
| 2,624,415 | Moore | Jan. 6, 1953 |
| 2,631,689 | Rubaloff | Mar. 17, 1953 |